United States Patent Office 3,436,176
Patented Apr. 1, 1969

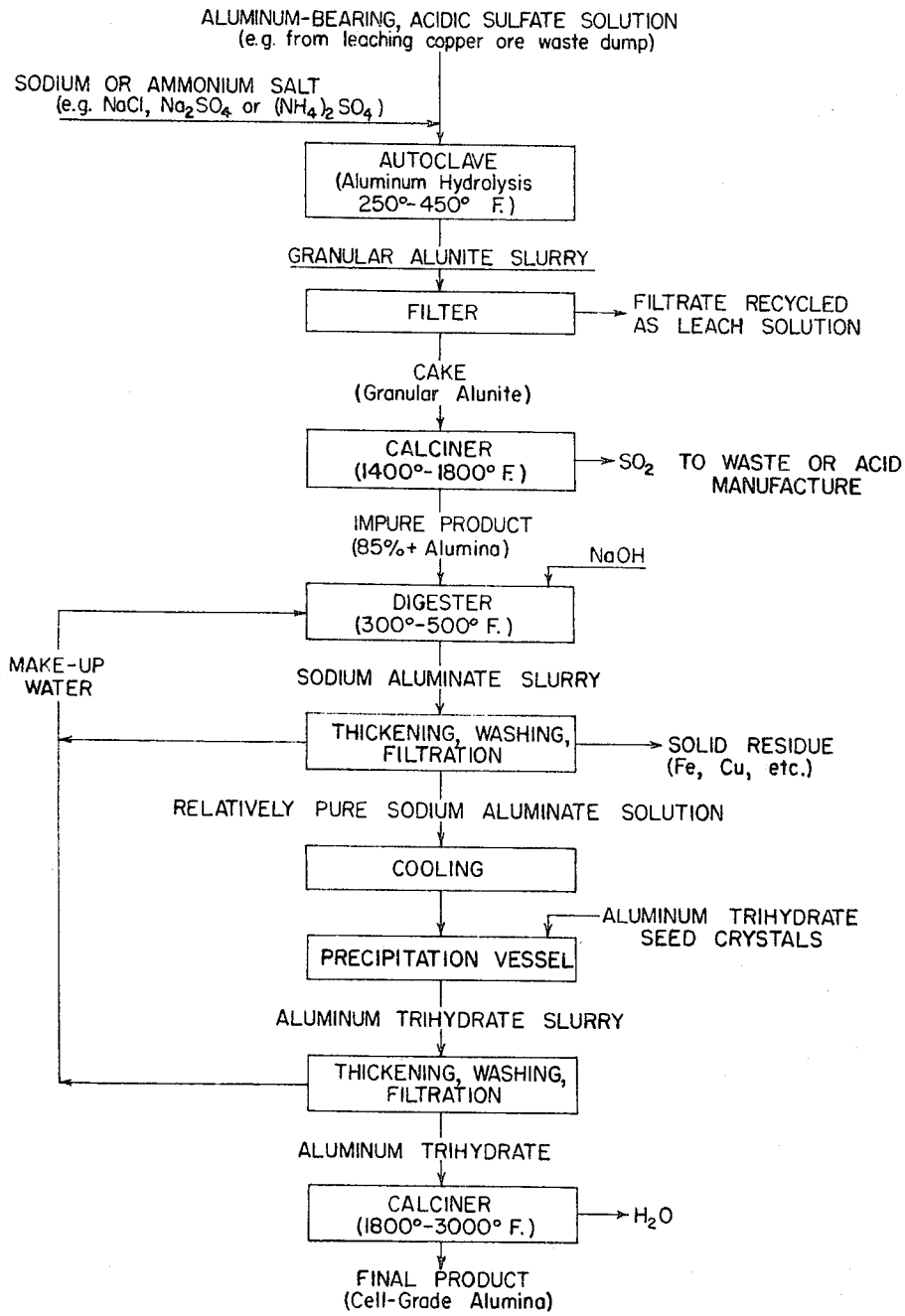

3,436,176
PROCESS OF PRODUCING HIGH PURITY ALUMINA FROM ALUMINUM-BEARING, ACIDIC, SULFATE SOLUTIONS
Henry Rush Spedden and Alfred Kenneth Schellinger, Salt Lake City, Utah, assignors to Kennecott Copper Corporation, New York, N.Y., a corporation of New York
Filed Mar. 14, 1966, Ser. No. 533,965
Int. Cl. C01f 7/34, 7/02
U.S. Cl. 23—143                                    8 Claims

ABSTRACT OF THE DISCLOSURE

Aluminum-bearing, acidic sulfate solutions are heated in the presence of sodium and/or ammonium salts at autogenous pressure to hydrolize the aluminum values and form a granular alunite precipitate. The precipitate is calcined to form a crude alumina product which is then digested in a strong caustic solution and purified in accordance with the well-known Bayer procedure to produce high-purity alumina.

---

This invention relates to processes for the production of high purity alumina, e.g. of cell-grade, from aluminum-bearing, acidic, sulfate solutions, especially those containing a relatively low ratio of aluminum values to heavy metal and iron values.

Cyclic leaching of waste dumps formed in the mining of copper ores is extensively practiced in arid or semiarid regions where conservation of water is of great importance. Considerable quantities of aluminum and sulfate ions tend to build up in and impair the usefulness of the weakly acidic, sulfate leach solution that is continually recycled through such a dump. The leach solution normally contains from about one to 1000 grams of aluminum to one gram of copper per liter of solution, depending upon whether or not copper has been percipitated from the pregnant solution coming from the dump.

Copending application Ser. No. 378,839 filed jointly by Stuart R. Zimmerley, Emil E. Malouf, John D. Prater and Alfred K. Schellinger on June 29, 1964, entitled "Improvements in pH-Adjusted, Controlled-Iron-Content Cyclic Leaching Processes for Copper-Bearing Rock Materials," now U.S. Patent 3,330,650 is concerned with that situation and discloses a process which includes extracting aluminum and sulfate ions from the solution between leaching cycles and obtaining what is there regarded as a high purity alumina as an end product. Known hydrolysis and purification procedures are employed for producing the alumina from the solution.

The present invention is concerned with and has as a principal object the provision of an improved process involving hydrolysis of the aluminum in such a leach solution in order to produce a higher grade alumina, e.g. cell-grade, as a by-product of the copper recovery operation, but it is not limited to such an operation. The process of the invention may be usefully applied to a wide range of aluminum-bearing, acidic, sulfate solutions, although it is most advantageous when applied to a solution of this kind, where, as with that used in the leaching of copper ore materials, the ratio of aluminum to heavy metal and iron content is low.

In accordance with the invention the starting solution is heated in the presence of sodium or ammonium ions at a temperature sufficient to hydrolize the aluminum values and produce a granular alunite precipitate. Preferably, the solution is heated to a temperature within the range of from about 250° to about 450° F., so as to produce, as a precipitate, a granular sodium or ammonium alunite containing only a small part of the impurities present in the starting solution.

It has been found that this granular sodium or ammonium alunite precipitate is peculiarly adapted for calcination at a temperature within the range of about 1400° to 1800° F. to produce a product containing in excess of 85% alumina and well adapted for purification by a modified Bayer procedure.

Thus, for purification of the alumina in the calcine, such calcine is digested with a caustic (sodium hydroxide) in a conventional digester at a temperature within the range of about 300° to about 500° F. to produce a sodium aluminate solution, which is seeded with small aluminum trihydrate crystals to precipitate pure aluminum trihydrate. Calcination of such aluminum trihydrate at a temperature within the range of about 1800° to 3000° F. yields cell grade alumina, which can be further processed by well known techniques to produce ceramic-grade, tabular alumina, if desired.

It is a feature of the process that sodium or ammonium salts, advantageously in the form of either chlorides or sulfates, are added during aluminum hydrolysis to yield a sodium or ammonium alunite that is peculiarly adapted for calcination to produce an intermediate product high in alumina and susceptible of relatively simple and straightforward purification to the exceptional high purity product desired.

In a paper entitled "Alumina by Acid Extraction" presented by T. R. Scott at the A.I.M.E. International Symposium on The Extraction Metallurgy of Aluminum held in New York in February 1962 (summarized in the February 1962 issue of "Journal of Metals") and in a somewhat later article entitled "The Hydrolysis of Aluminum Sulphate Solutions at Elevated Temperatures" by P. T. Davey and T. R. Scott, Division of Mineral Chemistry, Commonwealth Scientific and Industrial Research Organization, Melbourne, Australia, there are disclosed procedures for producing alumina from lowgrade aluminum ores, such as clays, by sulfuric acid leaching and hydrolysis of the aluminum sulfate solutions so-obtained. Certain aspects of these disclosures appear and are claimed in U.S. Patent No. 3,185,545 granted May 25, 1965 to T. R. Scott for "Production of Alumina."

Problems created by impurities precipitated with the basic aluminum sulfate during hydrolysis are discussed by these Australian researchers and various ways of eliminating such impurities are suggested, but we have found that the procedures there disclosed do not result in alumina of the requisite purity when the starting material is a low aluminum, high impurity, acidic, sulfate solution resulting from leaching copper sulfide and/or oxide ore materials, as in the aforesaid copending application, Ser. No. 378,839.

Further objects and features of the invention will become apparent from the following detailed description of the preferred procedures set forth by way of example in the flow sheet of the accompanying drawing.

In the drawing, the single figure is a flowsheet showing the invention applied to a typical aluminum-bearing, acidic, sulfate, leach solution.

Referring to the drawing:

The feed solution in the flowsheet may be considered as taken from a cyclic leaching system of the waste dump of a copper mine in accordance with the teaching of the aforementioned copending application Ser. No. 378,839, following the stripping of copper from the pregnant solution.

In accordance with the invention a sodium or ammonium salt, soluble in the acidic sulfate feed solution, is added to such feed solution until a concentration in the range of about 0.5 to about 10.0 grams of salt per liter is obtained, depending upon the amount of aluminum values present. With the salt added in this range, it has been found that over 85% of the aluminum values present in the solution precipitates, upon hydrolysis, as sodium or ammonium alunite, as the case may be. Higher concentrations of the sodium or ammonium salt can be used but are no more effective and are economically unfeasible.

The solution to which the sodium or ammonium salt has been added is hydrolyzed by heating it under corresponding autogenous pressure, as in a fluid-tight vessel such as a conventional autoclave, at a temperature within the range of about 250° to about 450° F. to produce a sodium or ammonium alunite precipitate, as the case may be, and a substantially aluminum-free solution. A typical analysis of the sodium or ammonium alunite formed by the foregoing process will be 35% to 45% $Al_2O_3$, less than 3% iron, and less than 5% sodium or ammonium ion.

Following separation of the precipitated sodium or ammonium alunite from the accompanying solution, as by filtration, it is subjected to calcination in a conventional calciner (e.g. within a temperature range of about 1400° to 1800° F.) to drive off $SO_2$, which can be sent to waste or can be used, if desired, for the manufacture of sulfuric acid for use in the leaching procedure from which the feed solution is taken. The essentially aluminum-free solution from which the sodium or ammonium alunite has been precipitated and separated normally will have a pH within the range of about 1 to about 1.5 and will be suitable for recycling to and through the waste dump.

The sodium or ammonium alunite precipitate is in granular form, which makes it easy to handle and to separate from the solution by filtration (e.g. at a rate of about 300 to about 1000 pounds per hour per sq. ft.). This intermediate product of the process is also exceptionally well adapted to the subsequent calcination step of the process.

The calcination product contains about 85% alumina, and, it has been found, is amenable to purification by a modified Bayer procedure, in accordance with which it is subjected to caustic digestion to produce an impure sodium aluminate solution that is seeded with small aluminum trihydrate crystals to precipitate aluminum trihydrate, which product is calcined to produce a cell-grade alumina product. This may, in turn, be acid leached, washed, dried, and sintered to produce a final ceramic-grade tabular alumina product, if desired.

The caustic digestion is preferably accomplished in a conventional digestion reactor over a time period of about two hours or less and within a temperature range of about 300° to about 500° F.

A relatively pure sodium aluminate solution for seeding purposes is obtained by thickening, washing, and filtering, or by equivalent steps, whereby impurities, particularly copper and iron, are eliminated in the separated solids as a waste residue.

Following cooling of the relatively pure sodium aluminate solution so-obtained, it is seeded with aluminum trihydrate seed crystals in a conventional precipitation vessel. The resulting aluminum trihydrate slurry is thickened, washed, and filtered, or subjected to equivalent treatment to produce a pure aluminum trihydrate, which, by calcination, usually within a temperature range of about 1800° to about 3000° F. to drive off the water of hydration and recrystallization, yields cell-grade alumina as a final product.

The process is particularly applicable to solutions containing aluminum values in concentration from about one to about fixe percent by weight and iron and heavy metal impurities in concentration of from about one to about ten percent by weight, but it can also be applied to advantage to solutions containing a much greater ratio of aluminum to iron and heavy metal values, for example to the same type of solutions as the Australian researchers were working with.

The following specific examples indicate the effectiveness of the process in producing the desired high purity alumina products from aluminum-bearing, acidic, sulfate solutions of relatively low aluminum ion concentration.

EXAMPLE I

A dilute, copper-bearing, acidic, sulfate, leach solution, bled off from a cyclic dump leaching and copper stripping operation and having a pH of 3.5 and the following analysis:

| | Grams/liter |
|---|---|
| Copper | 0.1 |
| Iron | 8.5 |
| $Al_2O_3$ | 12.3 |
| Residue on evaporation | 110 | was treated with sodium sulfate to bring the sodium analysis to 3 grams per liter and was hydrolyzed in an autoclave at temperature of about 350° F. and at corresponding autogenous pressure. The resultant slurry was passed through a filter at a rate of about 600 lbs./hr./sq. ft. to yield, as the filter cake, a substantially copper-free, granular, sodium alunite precipitate analyzing 40.5% $Al_2O_3$, 2.5% Fe, and 4.1% sodium. The purified solution had a pH of 1.5 and analyzed as follows:

| | Grams/liter |
|---|---|
| Copper | 0.10 |
| Iron | 8.0 |
| $Al_2O_3$ | 1.5 |
| Residue on evaporation | 60 |

The precipitate was calcined in the temperature range 1400° to 1800° F., resulting in a crude alumina substantially free of both copper and sulfur. This was digested with caustic soda and steam at a temperature of 400° F., the alumina dissolving and forming a concentrated solution of sodium aluminate. After thickening and filtering the resulting slurry and cooling the filtrate, aluminum trihydrate was precipitated from such filtrate by seeding with aluminum trihydrate seed crystals. The precipitated trihydrate was washed and filtered and calcined to produce a cell-grade alumina meeting specifications as to purity. Analysis of this product showed less than 0.012% Fe, less than 0.0001% $TiO_2$, 0.015% $SiO_2$, less than 0.0001% Cu, and less than 0.5% $Na_2O$. This calcined alumina was acid washed in 20% HCl at 150° F., then water washed, filtered, dried and sintered at 3000° F. to produce a ceramic grade tabular alumina much in demand for pure refractories manufacture. This grade was substantially sodium and iron free.

EXAMPLE II

A copper-bearing acidic, sulfate solution obtained from vat leaching acid-soluble copper ore and having a pH of 0.1 with the following analysis:

| | Grams/liter |
|---|---|
| Copper | 20.0 |
| Iron | 8.48 |
| $Al_2O_3$ | 21.7 | was treated in conventional agitation and settling equipment with sufficient copper precipitates and lime to adjust the pH to 1.8 and reduce ferric iron to the ferrous state. The resultant solution had no more than 0.5 gram per liter ferric iron. Its sodium ion content was brought to 2.3 grams/liter by treatment with salt cake in the agitators. As so treated, the solution was heated in an autoclave as in Example I at a temperature of about 350° F. to produce a slurry of granular, substantially copper-free, sodium alunite and a de-aluminized solution, which were separated rapidly by filtration. The solution had a pH of 1.0 and contained 19.8 grams per liter of copper, 5.40 grams per liter of iron, and 3.5 grams per liter of $Al_2O_3$. The granular sodium alunite analyzed 30.7% $Al_2O_3$, 4.60% Cu, 4.86% Fe, and 5% Na. It was calcined and digested as described in Example I to produce a sodium aluminate liquor, from which aluminum trihydrate was precipitated. Calcining of the aluminum trihydrate at a temperature within the range of about 1600° to about 1900° F., followed by acid washing and by drying produced alumina analyzing 0.04% Fe, 0.004% $TiO_2$, and 0.003% Cu.

Whereas this invention has been described in detail with respect to certain specific procedures representing what is presently contemplated as the best mode of putting it into practice, it should be understood that various changes may be made without departing from the inventive concepts particularly pointed out in the claims that follow.

We claim:

1. A process for producing high-purity alumina from aluminum-bearing, acidic, sulfate solutions, comprising the steps of heating such a solution at autogenous pressure in the presence of a reagent selected from the group consisting of a soluble sodium salt and a soluble ammonium salt, to a temperature sufficient to hydrolyze the aluminum values and to yield a granular alunite precipitate; and producing a substantially pure alumina product from said alunite precipitate.

2. A process as set forth in claim 1, wherein the solution is heated to within the temperature range of from about 250° to about 450° F.

3. A process as set forth in claim 1, wherein the acidic sulfate solution contains aluminum values in concentration of from about one to about five percent by weight, and iron and heavy metal impurities in concentration of from about one to about ten percent by weight.

4. A process as set forth in claim 1, wherein the alumina product is produced by a modified Bayer procedure comprising separating the alunite precipitated from the accompanying solution and calcining it; digesting the resulting calcine with a caustic solution of sodium hydroxide to yield a sodium aluminate solution; separating the sodium aluminate solution from residue solids, cooling it, and precipitating aluminum trihydrate therefrom; separating the precipitated aluminum trihydrate from the accompanying solution; and calcining said aluminum trihydrate to produce a high purity alumina product.

5. In the production of high purity alumina from an aluminum-bearing, acidic, sulfate solution, which solution also contains heavy metal impurities, by treating the solution to produce a precipitate containing aluminum compounds in admixture with said impurities, treating said precipitate to produce an aqueous solution of sodium aluminate, converting said sodium aluminate to aluminum trihydrate, and calcining said aluminum trihydrate to alumina, the improvement which comprises:

heating said aluminum-bearing, acidic, sulfate solution in the presence of about 0.5 to about 10.0 grams per liter of a dissolved salt selected from the group consisting of sodium salts and ammonium salts to produce a granular alunite precipitate;

calcining the alunite precipitate to produce an impure alumina product; and digesting said product in a caustic solution to produce said aqueous solution of sodium aluminate.

6. The improvement of claim 5, wherein the aluminum-bearing acidic, sulfate solution is heated to within the temperature range of from about 250 to about 450° F.

7. The improvement of claim 6, wherein the granular alunite precipitate is calcined at a temperature within the range of about 1400 to about 1800° F.

8. The improvement of claim 5, wherein the aluminum-bearing, acidic, sulfate solution is heated in a fluid-tight vessel at autogenous pressure to a temperature within the range of about 250 to about 450° C.; and the granular alunite precipitate is calcined at a temperature within the range of about 1400 to about 1800° F.

References Cited

UNITED STATES PATENTS

| 1,162,130 | 11/1915 | Buchner | 23—143 |
| 2,551,944 | 4/1947 | Haff | 23—143 |
| 3,185,545 | 5/1965 | Scott | 23—123 |
| 3,330,650 | 7/1967 | Zimmerley et al. | 75—117 |

FOREIGN PATENTS

| 123,720 | 1920 | Great Britain. |

OSCAR R. VERTIZ, *Primary Examiner.*

H. S. MILLER, *Assistant Examiner.*

U.S. Cl. X.R.

23—52, 123, 141; 75—117